D. ZABORSKY.
SPRING MOTOR FOR BICYCLES.
APPLICATION FILED OCT. 30, 1918.

1,374,797.

Patented Apr. 12, 1921.
2 SHEETS—SHEET 1.

Witnesses
R. G. Thomas.

Inventor
D. Zaborsky
By Victor J. Evans
Attorney

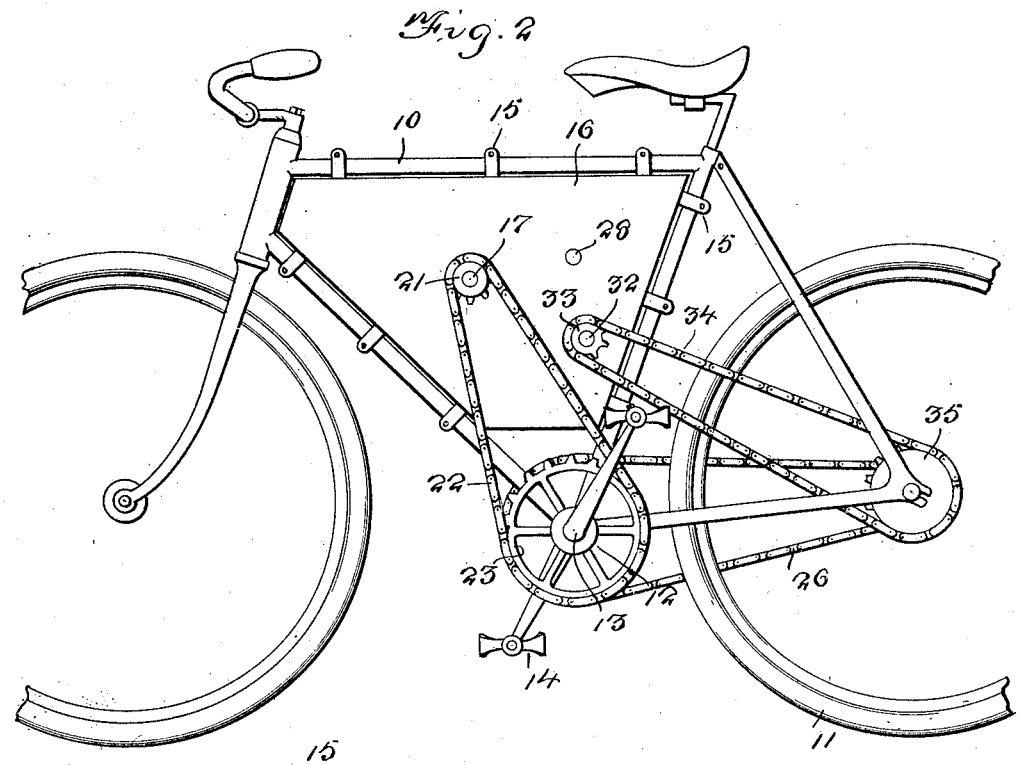

UNITED STATES PATENT OFFICE.

DANIEL ZABORSKY, OF CHICAGO, ILLINOIS.

SPRING-MOTOR FOR BICYCLES.

1,374,797.  Specification of Letters Patent.  Patented Apr. 12, 1921.

Application filed October 20, 1918. Serial No. 260,415.

*To all whom it may concern:*

Be it known that I, DANIEL ZABORSKY, citizen of Czechoslovakia, residing at Chicago, in the county of Cook and State of Illinois, have invented new and useful Improvements in Spring-Motors for Bicycles, of which the following is a specification.

This invention relates to bicycles and aims to provide a spring motor for use in connection therewith in which energy is stored through the operation by the rider, this energy being released at any time for the purpose of aiding the rider when desired, as in ascending grades.

To this end the invention includes an extra sprocket mounted upon the crank shaft and connected by means of a chain and sprocket with a spring motor to wind the latter, a coaster brake of usual construction being used in connection with the bicycle so that when the rider ceases to operate the pedals, the winding of the spring will stop and when sufficient energy has been stored this energy will act to propel or aid in propelling the bicycle through suitable gearing operated by the motor and connected to an extra sprocket mounted upon the hub of the drive wheel.

In the drawings:—

Fig. 2 is a similar view looking at the opposite side;

Fig. 4 is a section on the line 4—4 of Fig. 3;

Fig. 5 is a section on the line 5—5 of Fig. 3.

Figure 1:
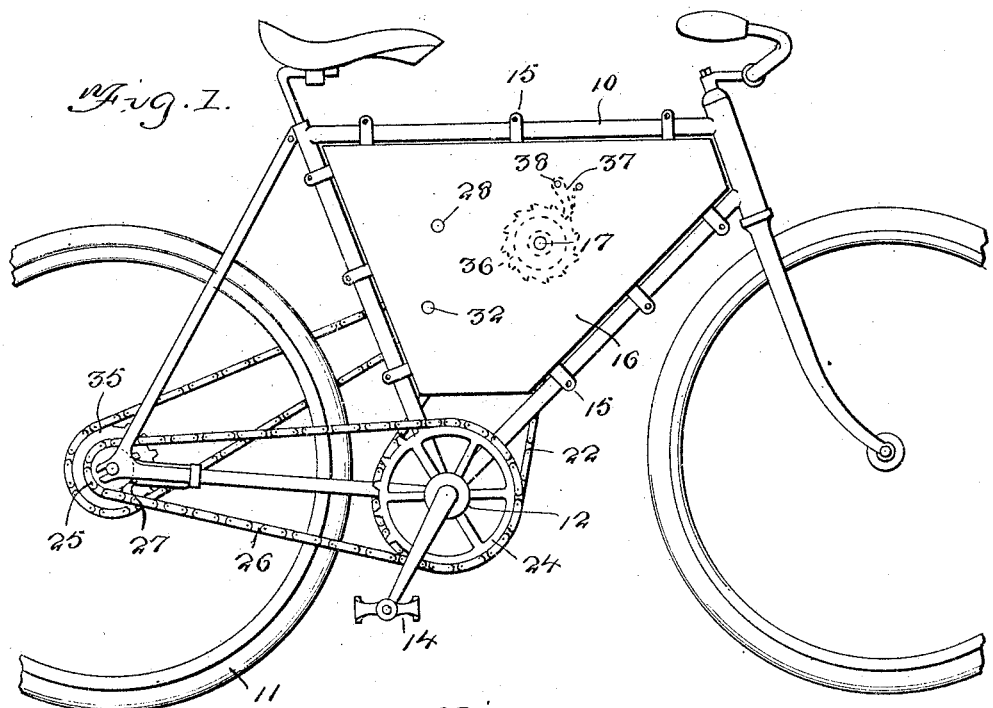
Figure 1 is a side elevation of a bicycle equipped with a spring motor embodying the present invention.
Figure 3:
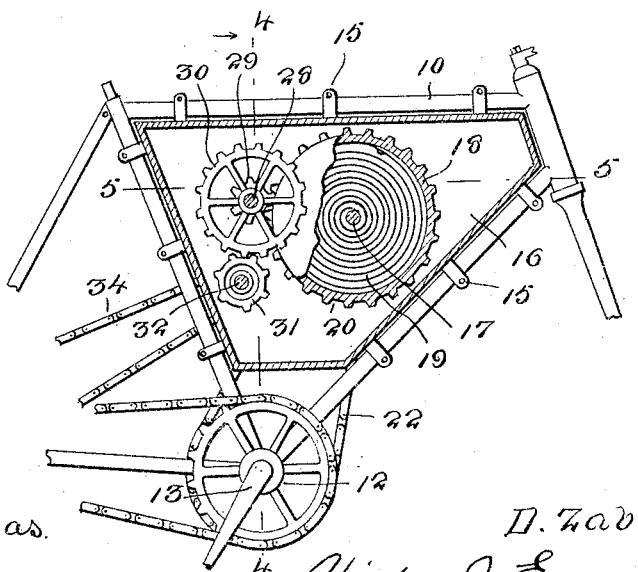
Fig. 3 is a side elevation showing the casing which protects the motor and gearing in section.

Referring to the drawings in detail, there is illustrated a bicycle of the usual construction which includes a frame 10, a rear drive wheel 11, a crank hanger 12 and a crank shaft 13, the latter carrying the usual pedals 14.

Secured within the frame of the bicycle through the medium of fastening elements 15, is a casing 16 which occupies the substantially triangular space contained within the frame 10. Mounted within the casing 16 upon a shaft 17, is a motor 18, the latter including a coil spring 19 and a casing surrounded by a gear 20. One end of the spring 19 is connected to the inner wall of the casing of the motor and its opposite end is connected to the shaft 17, while mounted upon its shaft is a sprocket 21, which is connected through the medium of a chain 22 to a sprocket 23 which is mounted upon the crank shaft 13, this sprocket being in addition to the usual sprocket 24 which is mounted upon the crank shaft for the purpose of driving the sprocket 25 through the chain 26 used in the ordinary operation of the bicycle. It is preferred that each of the sprockets 23 and 24 be mounted upon the crank shaft 13 upon opposite sides of the crank hanger 12 and as the sprocket 24 is herein shown as mounted upon the right hand side of the crank hanger the sprocket 23 will be mounted upon the opposite or left hand side. The bicycle is provided with a coaster brake 27 of suitable make.

Also mounted within the casing 16 is a shaft 28, which carries a pinion 29 which is engaged and driven by the gear 20. Also mounted upon the shaft 28 is a gear 30, which operates a gear 31 mounted upon a shaft 32 also having bearings in the casing 16. Mounted upon the shaft 32 is a sprocket 33 which through the medium of a chain 34 drives an extra sprocket 35 mounted upon the hub of the wheel 11. The sprockets 25 and 35 are disposed upon opposite sides of the hub.

In the operation of the invention, the motor is initially stored through the medium of the pedals 14, which through the sprocket connection winds the spring 19. When a sufficient amount of energy has been stored in the motor, the pedals 14 may be held at rest or in coasting position, when the motor will take up the operation of the bicycle and through its connection with the rear wheel 11 drive the latter. After the motor has been sufficiently stored the pedaling may entirely cease, or if desired the pedals may be driven slowly so as to prolong the operation of the motor.

Mounted upon the shaft 17 and within the casing 16, is a ratchet wheel 36, which is adapted to be engaged by a spring pressed dog 37 also mounted within the casing upon a pivot pin 38. This ratchet mechanism prevents reverse movement of the gearing, so that the spring 19 may be properly tensioned.

The invention is susceptible of various changes in its form, proportions and minor details of construction and the right is reserved to make such changes.

Having described the invention, what is claimed is:

The combination with a bicycle provided with a coaster brake, of a casing secured within the frame of the bicycle, a spring motor housed within the casing, an extra sprocket located upon the crank shaft of the bicycle, a sprocket located upon one side of the casing and connected to the extra sprocket by means of a chain, whereby operation of the crank shaft will wind the motor, an extra sprocket connected to the drive wheel of the bicycle, a second sprocket located upon the outside of the casing and operatively connected to the spring motor and a chain connecting this last mentioned sprocket with the extra sprocket of the drive wheel, whereby operation of the motor will impart movement to the drive wheel.

In testimony whereof I affix my signature.

DANIEL ZABORSKY.